(12) United States Patent
Watanabe et al.

(10) Patent No.: US 9,383,078 B2
(45) Date of Patent: Jul. 5, 2016

(54) ILLUMINATION LENS

(71) Applicant: OSHINO LAMPS LIMITED, Tokyo (JP)

(72) Inventors: Tomoyuki Watanabe, Tokyo (JP); Masaaki Yamanishi, Tokyo (JP); Hong Yong Zhang, Tokyo (JP); Shuichi Kudo, Tokyo (JP)

(73) Assignee: OSHINO LAMPS LIMITED, Tokyo (JP)

( * ) Notice: Subject to any disclaimer, the term of this patent is extended or adjusted under 35 U.S.C. 154(b) by 0 days.

(21) Appl. No.: 14/891,224

(22) PCT Filed: May 20, 2013

(86) PCT No.: PCT/JP2013/063973
§ 371 (c)(1),
(2) Date: Nov. 13, 2015

(87) PCT Pub. No.: WO2014/188498
PCT Pub. Date: Nov. 27, 2014

(65) Prior Publication Data
US 2016/0091167 A1    Mar. 31, 2016

(51) Int. Cl.
*F21V 5/00* (2015.01)
*B60Q 3/02* (2006.01)
*F21V 5/08* (2006.01)
*F21V 17/10* (2006.01)
*F21Y 101/02* (2006.01)

(52) U.S. Cl.
CPC .............. *F21V 5/008* (2013.01); *B60Q 3/0286* (2013.01); *F21V 5/08* (2013.01); *F21V 17/101* (2013.01); *F21Y 2101/02* (2013.01)

(58) Field of Classification Search
None
See application file for complete search history.

(56) References Cited

U.S. PATENT DOCUMENTS

2011/0273876 A1* 11/2011 Stolyar ................. F21V 17/101
                                                     362/235
2012/0307503 A1* 12/2012 Wilcox ................... F21V 5/008
                                                     362/308

FOREIGN PATENT DOCUMENTS

| JP | 2006-123794 A | 5/2006 |
|----|---------------|--------|
| JP | 2010-091905 A | 4/2010 |
| JP | 2011-173437 A | 9/2011 |
| WO | 2010/061649 A1 | 6/2010 |
| WO | 2012/133375 A1 | 10/2012 |

OTHER PUBLICATIONS

International Search Report issued in Application No. PCT/JP2013/063973, mailed on Aug. 6, 2013 and translation thereof (2 pages).

* cited by examiner

*Primary Examiner* — Sharon Payne
(74) *Attorney, Agent, or Firm* — Nakanishi IP Associates, LLC (57) ABSTRACT

Light sources include light-emitting surfaces only on a condenser lens side to emit illumination light. The condenser lens and the refraction optical member are formed integrally.

12 Claims, 10 Drawing Sheets

SECTIONAL VIEW A-A

SECTIONAL VIEW B-B

FIG.17

SECTIONAL VIEW C-C

ILLUMINATION LENS

This invention is related to an illumination lens to illuminate a predetermined area by illumination light emitted from a light source.

BACKGROUND ART

A vehicle is equipped with several illumination devices. For instance, an interior lamp to illuminate the vehicle interior, or a map lamp to illuminate each seat to aid the passenger to see a map, etc.

An illumination device for a vehicle is disclosed in Japanese Patent Laid-Open Publication No. 2006-123794 (Patent Literature 1) as an example of the illumination devices. The illumination device for a vehicle includes an illumination module extending in the front-and-rear direction on the ceiling of the vehicle. The illumination module has LEDs at the front end, middle section, and rear end thereof. In the illumination device, illumination light from the plurality of LEDs is condensed and emitted to a predetermined direction by a light condensing part comprising a plurality of condenser lenses.

Also, an illumination device is disclosed in Japanese Patent Laid-Open Publication No. 2011-173437 (Patent Literature 2). This illumination device includes a map-lamp unit provided on the ceiling of the vehicle and uses a condenser lens to illuminate a predetermined area by illumination light emitted from LED light sources disposed in the map lamp unit.

SUMMARY

The illumination device for a vehicle disclosed in Patent Literature 1 arranges the plurality of LEDs side by side longitudinally and horizontally and tilts optical axes of the plurality of LEDs to a specified direction. To do so, the illumination device has an individual substrate for each of the plurality of LEDs and tilts each substrate to the same direction. Since the illumination device for a vehicle disclosed in Patent Literature 1 needs a substrate for each LED, it increases the cost.

The illumination device disclosed in Patent Literature 2 includes diaphragm apertures to suppress light diffusion to undesired directions so as to illuminate only the predetermined area. That is, the illumination device of Patent Literature 2 uses only a part of light emitted from the LED light sources. As a result, the illumination device of Patent Literature 2 needs to have high-luminance LED light sources and generates the energy loss. Further, this energy loss is discharged as a heat to the inside of the illumination device, resulting in reduction of reliability for the device.

An object of the embodiments of the present invention is, therefore, to provide an illumination lens that can suppress light diffusion to undesired directions with a small energy loss.

In order to achieve the object, the illumination lens of the embodiments of the present invention includes a condenser lens configured to receive and condense light emitted from a light source and a refraction optical member configured to receive and refract the light condensed by the condenser lens. The illumination lens is configured such that the illumination light emitted from the light source illuminates a predetermined area in a spot shape through the condenser lens and the refraction optical member. The light source includes a light-emitting surface configured to emit the illumination light toward only the condenser lens. The condenser lens and the refraction optical member are formed integrally.

DESCRIPTION OF EMBODIMENTS

Hereinafter, embodiments of the present invention will be described with reference to the drawings.

Embodiment 1

Figure 1:
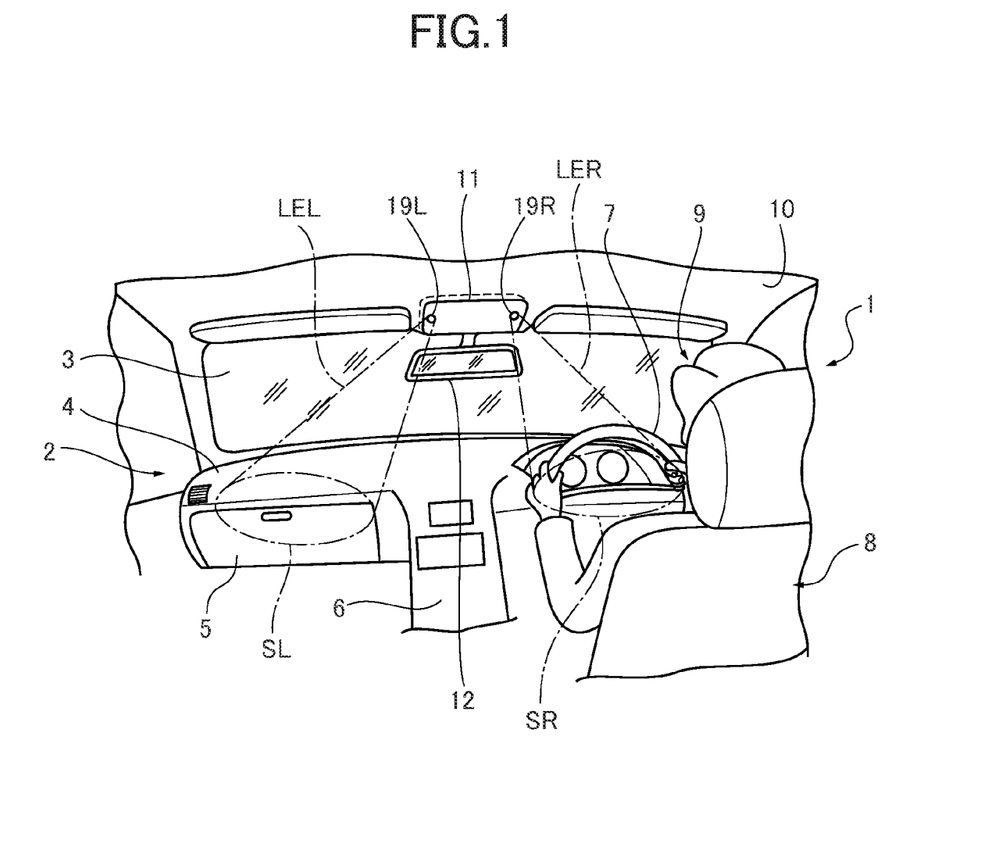
FIG. 1 is an explanatory view partially showing a vehicle having an illumination device equipped with an illumination lens according to a first embodiment of the present invention.

FIG. 1 is an explanatory view partially showing a vehicle such as a car having an illumination device equipped with an illumination lens according to the present invention. In FIG. 1, a reference sign 1 represents a vehicle body, a sign 2 represents a vehicle interior, a sign 3 represents a windscreen across the front of the vehicle interior 2, a sign 4 represents an instrument panel provided at the front of the vehicle interior 2, and a sign 5 represents a glove compartment provided in the instrument panel 4 on the passenger's seat side. Further, a sign 6 represents an AV equipment fitting panel provided at a center of the instrument panel 4 in the width direction of the vehicle, a sign 7 represents a steering wheel, a sign 8 represents a driver's seat, a sign 9 represents a driver seating on the driver's seat 8, and a sign 10 represents a headlining forming a part of a ceiling of the vehicle interior 2. Additionally, a sign 11 represents an illumination device disposed at a front end of and a center in the width direction of the headlining 10, and a sign 12 represents a rearview mirror disposed at a front side of the illumination device 11.

Figure 2:
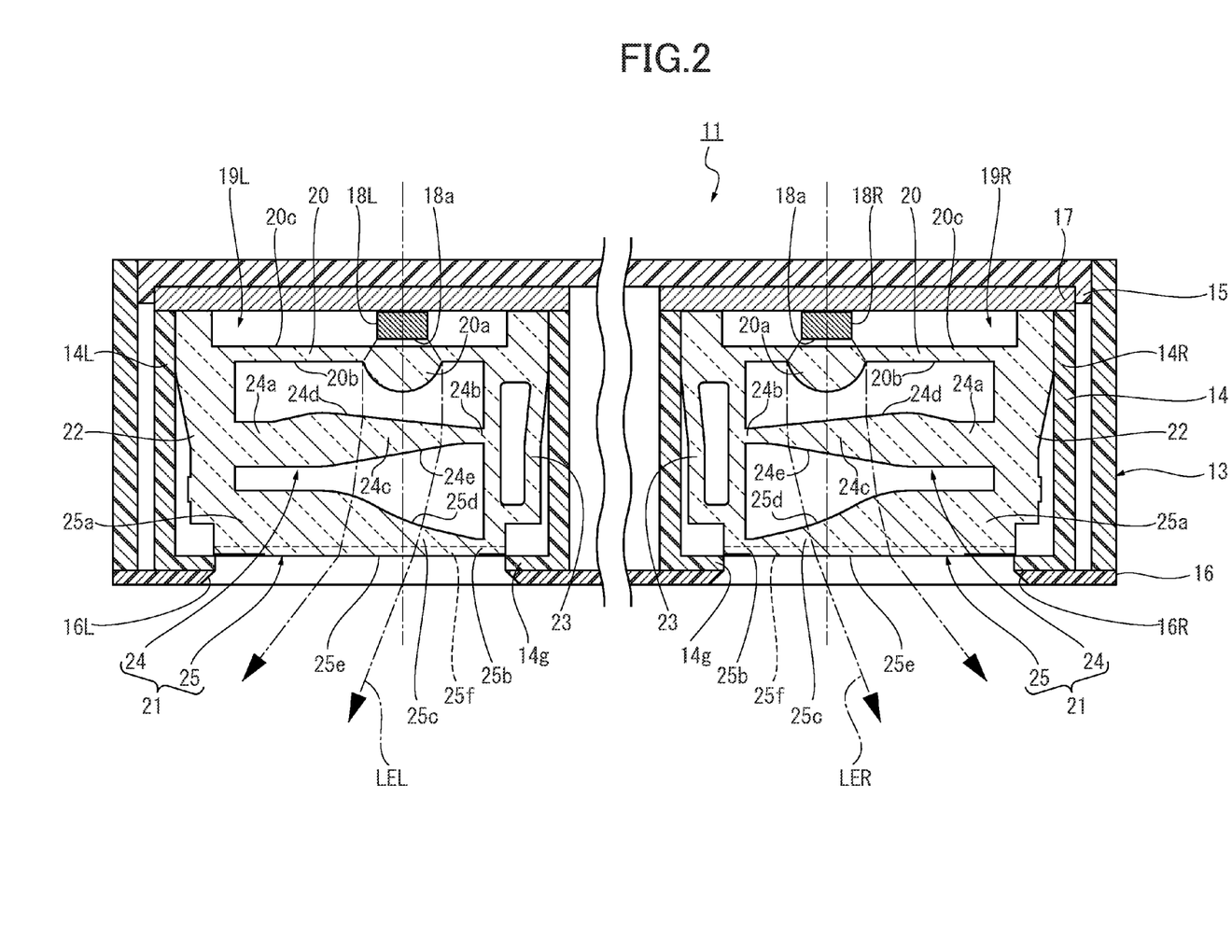
FIG. 2 is a sectional view of the illumination device of FIG. 1.

As illustrated in FIG. 2, the illumination device 11 includes a flat-shaped main body 13 for the illumination device. The main body 13 includes a flat case 14. The flat case 14 has cylindrical parts 14L, 14R on both sides thereof to install lenses. The cylindrical parts 14L, 14R have openings at the vehicle-interior side, respectively. The main body 13 also includes a rear cover 15 provided on the rear side of the flat case 14 and a decorative cover 16 provided on the vehicle-interior side of the flat case 14. The rear cover 15 and the decorative cover 16 are detachably attached to the flat case 14 with a fixing means such as locking craws and screws (not illustrated). The decorative cover 16 is formed with openings 16L, 16R corresponding to the cylindrical parts 14L, 14R.

Further, the illumination device 11 includes a printed substrate 17 and light sources 18L, 18R. The printed substrate is disposed in the flat case 14 on the rear cover 15 and pressed to end portions of the cylindrical parts 14L, 14R by the rear cover 15. The light sources 18L, 18R are installed on the printed substrate 17 so as to be oriented to the cylindrical parts 14L, 14R. Here, the light sources 18L, 18R use, for example, light emitting diodes (LEDs).

Further, as illustrated in FIG. 2, the illumination device 11 includes illumination lenses 19L, 19R. The illumination lenses 19L, 19R refract light from the light sources 18L, 18R so as to emit illumination light to a predetermined area. The illumination lenses 19L, 19R are formed by injection molding.

The illumination lenses 19L, 19R have the same structure. Only the refractive directions thereof are different from each other. Therefore, the same structures or elements of the illumination lenses 19L, 19R are indicated by the same reference signs, and only the illumination lens 19L will be described, i.e., the detailed description of the illumination lens 19R will be omitted.

Figure 6:
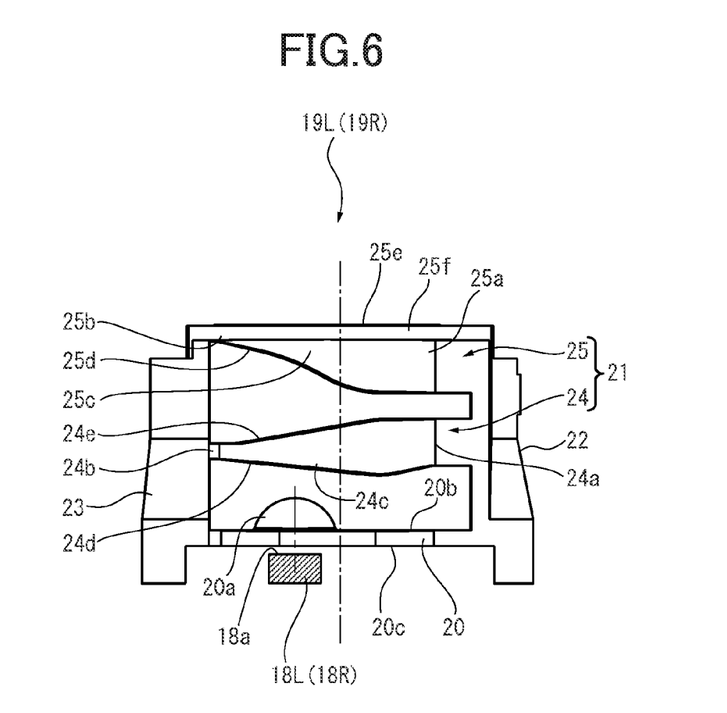
FIG. 6 is a right-side view of the illumination lens of FIG. 3.

As illustrated in FIGS. 2 and 6, the illumination lens 19L includes a lens forming plate 20 including a condenser lens 20a, a light-deflection part 21 to refract illumination light advanced from the condenser lens 20a to a prearranged direction, and a pair of first and second supporting poles 22, 23 to support the lens forming plate 20 and the light-deflection part 21 integrally. Also, the light-deflection part 21 includes a refraction lens 24 (first light-refraction part) on the light source 18L and a refraction lens 25 (second light-refraction part), as illustrated in FIGS. 2, 3, 5, 6, and 8. The refraction lens 24 is positioned on the light source 18L side, and the refraction lens 25 is positioned on the light-emission side of the illumination lens 19L. Next, a detailed structure of the illumination lens 19L will be described.

Figure 8:
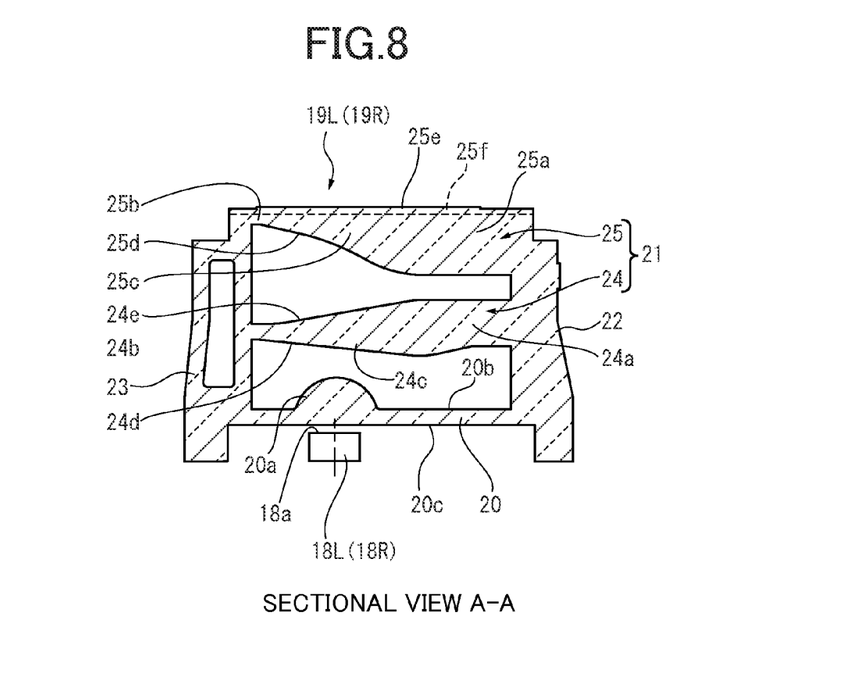
FIG. 8 is a sectional view along a line A-A of FIG. 4.

In the lens forming plate 20, a surface facing the refraction lens 24 (first light-refraction part) is defined as a lens forming surface 20b, and a surface on the other side of the lens forming surface 20b is defined as a light-source-side surface 20c, as illustrated in FIGS. 2, 6, and 8. The condenser lens 20a is projected in a hemispherical shape toward the refraction lens 24 from the lens forming surface 20b. The condenser lens 20a condenses divergent light diverged from the light source 18L into an illumination light flux, which is similar to a parallel light flux, and then emits the illumination light flux. Note that the condenser lens 20a is integrally formed on the lens forming plate 20 when forming the lens forming plate 20 by the injection molding.

The refraction lens (first light-refraction part) 24 has a thick portion 24a at one end thereof and a thin portion 24b at the other end thereof, as illustrated in FIGS. 2, 6, and 8. Further, the refraction lens 24 has a thickness varying portion 24c connecting the thick portion 24a and the thin portion 24b. The thickness of the thickness varying portion 24c gradually decreases as going from the thick portion 24a to the thin portion 24b.

In the refraction lens 24, a light-incident surface 24b facing to the condenser lens 20a is inclined toward the opposite side of the condenser lens 20a side as going from the thick portion 24a to the thin portion 24b. Further, in the refraction lens 24, a light-emission surface 24e (a facing refraction surface against the refraction lens 25) is inclined toward the condenser lens 20a side as going from the thick portion 24a to the thin portion 24b. That is, the thickness varying portion 24c is formed in a tapered shape such that the thickness of the thickness varying portion 24c gradually decreases as going from the thick portion 24a to the thin portion 24b.

Note that it is difficult to die-cut toward the thin portion 24b during the injection molding of the illumination lens 19L because of the first and second supporting poles 22, 23, and the condenser lens 20a. Therefore, the die-cutting during the injection molding should be done in a direction vertical to the paper surface in FIG. 8. To do so, the light-incident surface 24d and the light-emission surface 24e of the refraction lens 24 have a draft angle for injection molding in the direction vertical to the paper surface in FIG. 8. By having the draft angle, the refraction lens 24 can refract the illumination light to spread the illuminated area with an elliptic shape toward the minor axis direction of the area, as described later. Further, a plan shape of the refraction lens 24 is formed in a circle, as illustrated in FIG. 7.

Figure 3:
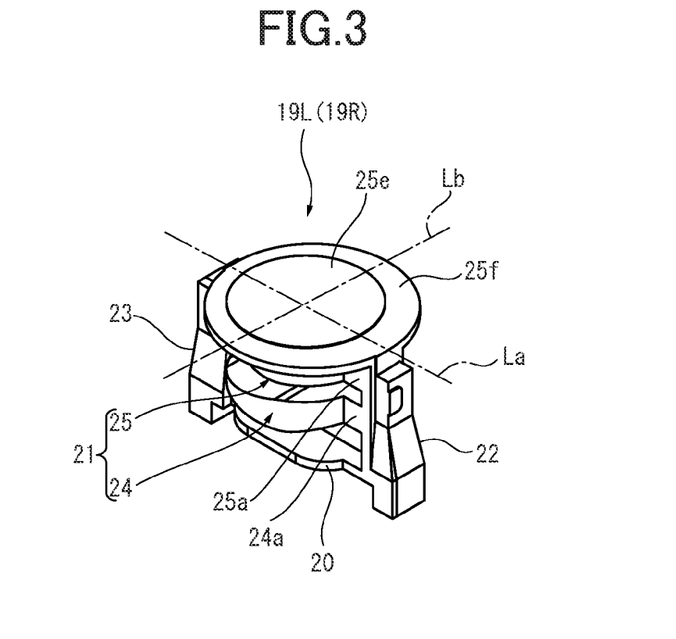
FIG. 3 is a perspective view of the illumination lens provided to the illumination device of FIG. 2.
Figure 4:
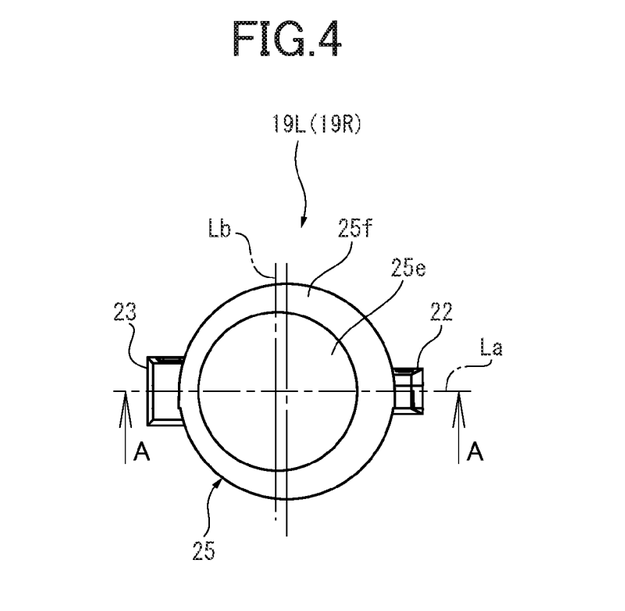
FIG. 4 is a plan view of the illumination lens of FIG. 3.
Figure 5:
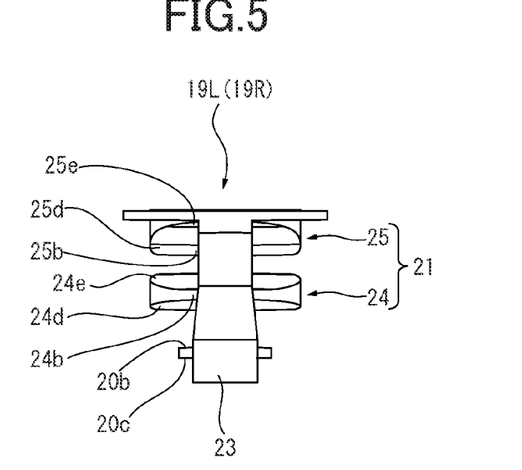
FIG. 5 is a left-side view of the illumination lens of FIG. 3.
Figure 7:
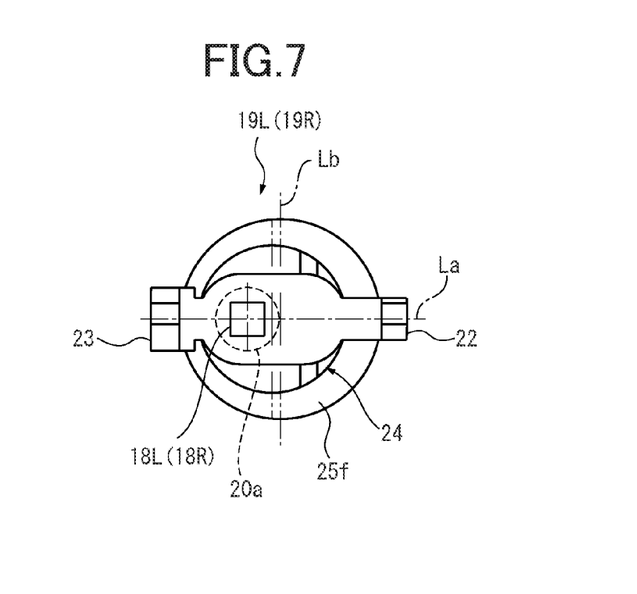
FIG. 7 is an explanatory view showing a positional relationship between a bottom surface of the illumination lens of FIG. 4 and light sources of FIG. 2.

Here, a line connecting circumferential centers of the thick portion 24a and the thin portion 24b of the refraction lens 24 is defined as a virtual line La, as illustrated in FIGS. 3, 4, and 7. Further, a line orthogonal to the virtual line La is defined as a virtual line Lb in FIGS. 3, 4, and 7.

In the refraction lens 24 of the illumination lens 19R, the thick portion 24a is disposed on the outer side of the vehicle interior 2 in the width direction, while the thin portion 24b is disposed on the center side of the vehicle interior 2 in the width direction, as illustrated in FIG. 2. Besides, the virtual line La of refraction lens 24 of the illumination lens 19L illustrated in FIGS. 3, 4, and 7 is oriented to the width direction.

In this embodiment, the virtual line La is tilted toward the vehicle longitudinal direction such that the illumination light emitted from the illumination lens 19L illuminates the rear end and the left side (passenger's side) of the instrument panel 4 (i.e., the illumination light is emitted toward the backward) from the disposing position of the illumination device 11.

In the refraction lens 24 of the illumination lens 19R, the thick portion 24a is disposed on the outer side of the vehicle interior 2 in the width direction, while the thin portion 24b is disposed on the center side of the vehicle interior 2 in the width direction, as illustrated in FIG. 2. In this embodiment, the virtual line La is tilted toward the vehicle longitudinal direction such that the illumination light emitted from the illumination lens 19R illuminates the steering wheel 7 on the driver's seat side (i.e., the illumination light is emitted toward the backward) from the disposing position of the illumination device 11.

The refraction lens (second light-refraction part) 25 has a thick portion 25a at one end thereof and a thin portion 25b at the other end thereof, as illustrated in FIGS. 2, 6, and 8. Further, the refraction lens 25 has a thickness varying portion 25c connecting the thick portion 25a and the thin portion 25b. The thickness of the thickness varying portion 25c gradually decreases as going from the thick portion 25a to the thin portion 25b.

Further, the refraction lens 25 includes a light-incident surface 25d facing to the light-emission surface 24e of the refraction lens 24. The light-incident surface 25d is a refraction surface having a convex-and-concave shape, and the cylindrical axis of the refraction lens 25 extends in the direction along the virtual line Lb.

As illustrated in FIGS. 3, 4, and 7, a plan shape of the refraction lens 25 is formed in a circle. Further, a light-emission surface 25e formed on the opposite side of the light-incident surface 25d is formed to be flat. Additionally, a flange 25f is formed around the refraction lens 25, as illustrated in FIGS. 2 to 8. The flange 25f is supported by an inner flange 14g of the cylindrical part 14L at a non-illustrated position in FIG. 2.

Similar to the refraction lens 24, the light-incident surface 25d of the refraction lens 25 also has a draft angle for injection molding in the vertical direction to the paper surface in FIG. 8. Further, a plan shape of the refraction lens 25 is formed in a circle, as illustrated in FIG. 4.

By having the abovementioned structure, the light-emission surface (facing refraction surface) 24e of the refraction lens 24 and the light-incident surface (facing refraction surface) 25d of the refraction lens 25 are facing each other and are gradually separated from each other as going from the thick portions 24a, 25a to the thin portions 24b, 25b.

Here, a line connecting circumferential centers of the thick portion 25a and the thin portion 25b coincides with the virtual line La.

In the refraction lens 25 of the illumination lens 19L; the thick portion 25a is disposed on the outer side of the vehicle interior 2 in the width direction, while the thin portion 25b is disposed on the center side of the vehicle interior 2 in the width direction, as illustrated in FIG. 2. Besides, the virtual line La of the refraction lens 25 of the illumination lens 19L is oriented toward the width direction, as illustrated in FIGS. 3, 4, and 7.

Note that in the refraction lens 25 of the illumination lens 19L, the thick portion 25a is disposed at a position on the outer side of the vehicle interior 2 in the width direction, while the thin portion 25b is disposed on the center side of the vehicle interior 2 in the width direction, as illustrated in FIG. 2.

In the refraction lenses 24, 25, the thick portions 24a, 25a and the thin portions 24b, 25b are integrally formed at the middle portions and the top portions of the first and second supporting poles 22, 23 by the injection molding such that the refraction lenses 24, 25 are supported by the first and second supporting poles 22, 23. Here, the first and second supporting poles 22, 23 extend toward a direction along the optical axis of the condenser lens 20a.

The first and second supporting poles 22, 23 are projected from the lens forming plate 20 toward the light source 18L so as to make a gap between the printed substrate 17 and the lens forming plate 20. That is, a light-emitting surface 18a of the light source 18L is positioned in the vicinity of the light-source-side surface 20c of the lens forming plate 20. Note that the light source 18L is disposed at a position corresponding to the condenser lens 20a. Further, the light emitting center on the light-emitting surface 18a of the light source 18L coincides with the optical axis of the condenser lens 20a.

Next, acts of the illumination device 11 having the above-explained structures will be described.

Upon lighting the light source 18L of the illumination lens 19L of the illumination device 11 illustrated in FIG. 2, divergent light emitted from the light source 18L enters the condenser lens 20a. The divergent light is condensed into an illumination light (illumination light flux) LEL, which is a substantially parallel light flux, by the condenser lens 20a and then advances from the condenser lens 20a. Note that the illumination light advanced from the condenser lens 20a is not exactly a parallel light flux, i.e., the illumination light diverges with a slight angle.

The illumination light LEL advanced from the condenser lens 20a enters the light-incident surface 24d of the refraction lens 24 and is refracted toward the left side in the thickness varying portion 24c of the refraction lens 24. When the light is emitted from the light-emission surface 24e of the thickness varying portion 24c, the light is further refracted toward the left side on the paper surface. The light-incident surface 24d, the light-emission surface 24e, and the light-emission surface 25e have the draft angle for injection molding in the direction vertical to the paper surface in FIG. 8. As a result, by utilizing the light condensing acts of the condenser lens 20a, the refraction lenses 24, 25 can refract the illumination light to spread the illuminated area with an elliptic shape toward the minor axis direction of the area, as described later.

The illumination light LEL emitted from the light-emission surface 24e enters the light-incident surface 25d of the refraction lens 25 and is refracted toward the left side on the paper surface in the thickness varying portion 25c. When the light is emitted from the light-emission surface 25e of the refraction lens 25, the light is further refracted toward the left side.

The illumination light LEL is then refracted through a prism action of the refraction lenses 24, 25 and emitted from the illumination lens 19L to the vehicle interior 2. A light flux diameter of the illumination light LEL gradually expands as the illumination light LEL advances away from the illumination lens 19L. Consequently, the illumination light LEL forms the illumination area SL with an elliptic shape on the instrument panel 4 on the left side (passenger's seat side), as illustrated in FIG. 1. Here, the illumination area having the elliptic shape has the major axis in the left-and-right direction on the paper surface and the minor axis in the longitudinal direction thereon.

On the other hand, upon lighting the light source 18R of the illumination lens 19R of the illumination device 11 illustrated in FIG. 2, divergent light emitted from the light source 18R is condensed into an illumination light LER, which is a substantially parallel light flux, by the condenser lens 20a of the illumination lens 19R, and then emitted from the illumination lens 19R after being refracted toward the opposite side compared with the illumination light LEL. Consequently, the illumination light LER forms the illumination area SR with an elliptic shape around the steering wheel 7, as illustrated in FIG. 1. The illumination area SR having the elliptic shape has the major axis in the left-and-right direction and the minor axis in the longitudinal direction.

Embodiment 2

FIGS. 9 to 17 show a second embodiment of the present invention. An illumination device 11A of the second embodiment includes illumination lenses 30L, 30R in place of the illumination lenses 19L, 19R of the first embodiment. Here, the illumination lenses 30L, 30R are incorporated in a main body 13 of the illumination device.

The illumination lenses 30L, 30R have the same structure. Only the refractive directions thereof are different from each other. Therefore, the same structures or elements of the illumination lenses 30L, 30R are indicated by the same reference signs, and only the illumination lens 30L will be described, i.e., the detailed description of the illumination lens 30R will be omitted.

As illustrated in FIGS. 10, 11, 14 and 15, the illumination lens 30L includes a lens forming plate 31 installing a pair (a plurality) of condenser lenses 31a, 31a.

As illustrated in FIGS. 10, 11, 13, 14, 16, and 17, the illumination lens 30L includes a light-deflection part 32 to refract illumination light advanced from the condenser lenses 31a, 31a to a prearranged direction. Further, the illumination lens 30L includes first and second supporting poles 33, 34 to support the lens forming plate 31 and the light-deflection part 32 integrally. The illumination lens 30L is formed by injection molding.

As illustrated in FIGS. 10, 11, 13, 14, 16, and 17, the light-deflection part 32 further includes a refraction lens 35 (first light-refraction part) and a refraction lens 36 (second light-refraction part). The refraction lens 35 is positioned on the light source 18L side, and the refraction lens 36 is positioned on the light-emission side of the illumination lens 30L. Next, each part of the illumination lens 30L will be described.

Figure 13:
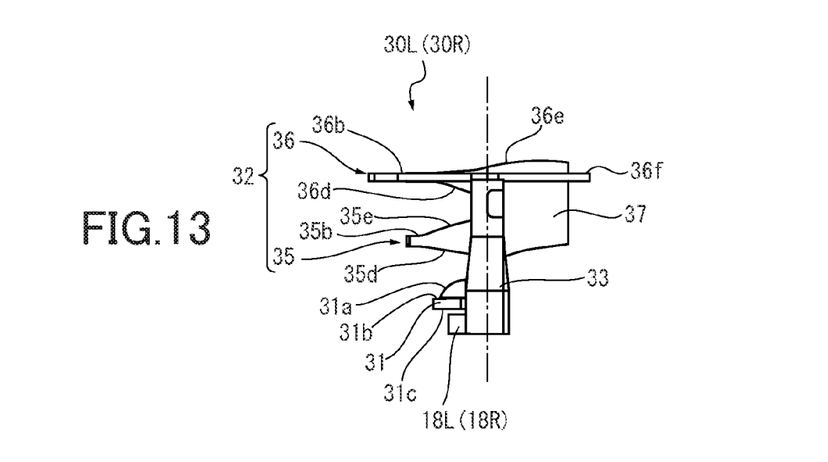
FIG. 13 is a right-side view of the illuminations lens illustrated in FIG. 11.
Figure 14:
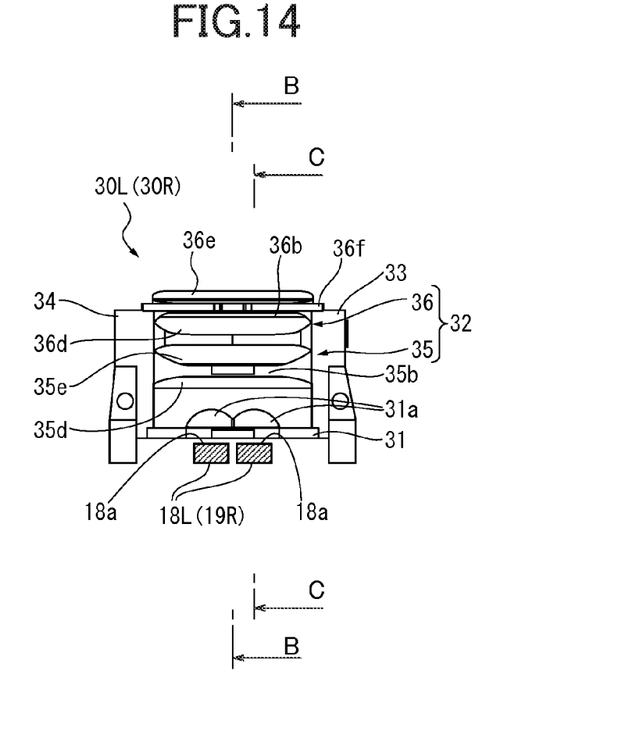
FIG. 14 is a left-side view of the illuminations lens illustrated in FIG. 11.
Figure 16:
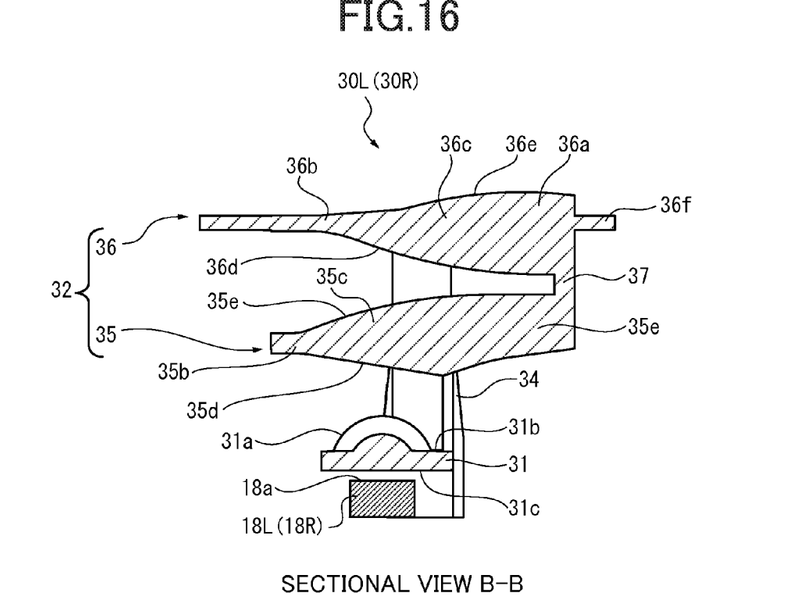
FIG. 16 is a sectional view along a line B-B of FIG. 14.
Figure 17:
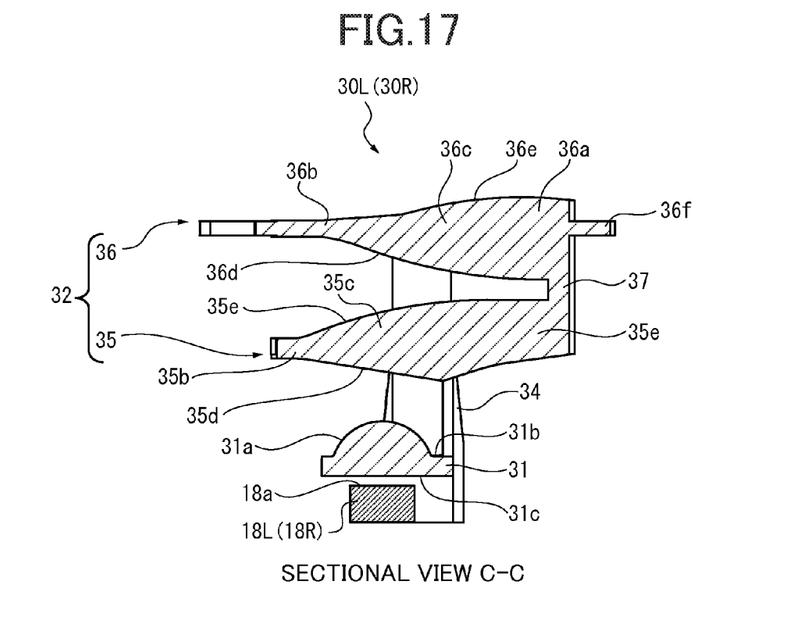
FIG. 17 is a sectional view along a line C-C of FIG. 14.

In the lens forming plate 31, a surface facing the side of the refraction lens 35 is defined as a lens forming surface 31b, and a surface on the other side of the lens forming surface 31b is defined as a light-source-side surface 31c, as illustrated in FIGS. 13, 16, and 17. The condenser lenses 31a, 31a are projected in a hemispherical shape from the lens forming surface 31b toward the refraction lens 35. Here, adjacent parts of the condenser lenses 31a, 31a are connected and overlapped by a prescribed amount. The condenser lenses 31a, 31a condense divergent light diverged from the pair (the plurality) of the light sources 18L, 18R (illustrated in FIG. 14) into an illumination light flux, which is similar to a parallel light flux, and then emit the illumination light flux. Note that the condenser lenses 31a, 31a are integrally formed on the lens forming plate 31 when forming the lens forming plate 31 by the injection molding.

Figure 10:
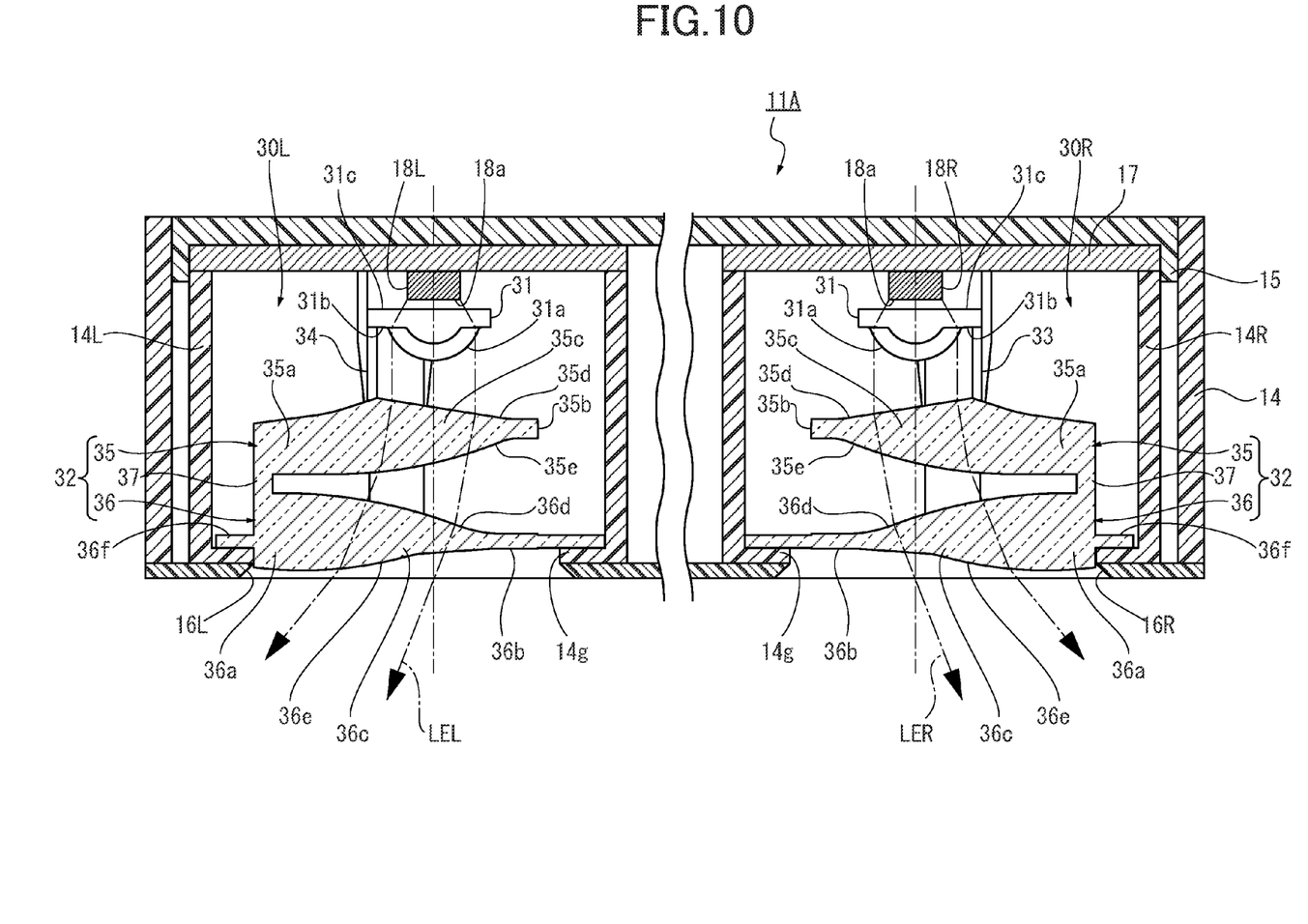
FIG. 10 is a sectional view of the illumination device illustrated in FIG. 9.

The refraction lens (first light-refraction part) 35 has a thick portion 35a at one end thereof and a thin portion 35b at the other end thereof, as illustrated in FIGS. 10, 16, and 17. Further, the refraction lens 35 has a thickness varying portion 35c connecting the thick portion 35a and the thin portion 35b. The thickness of the thickness varying portion 35c gradually decreases as going from the thick portion 35a to the thin portion 35b.

In the refraction lens 35, a light-incident surface 35d facing to the condenser lens 31a is inclined toward the other side of the condenser lens 31a side as going from the thick portion 35a to the thin portion 35b.

Figure 11:
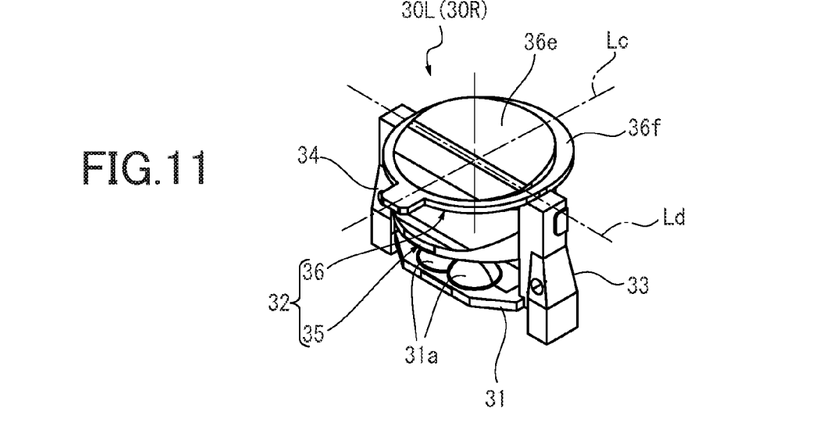
FIG. 11 is a perspective view of the illumination lens illustrated in FIG. 9.
Figure 12:
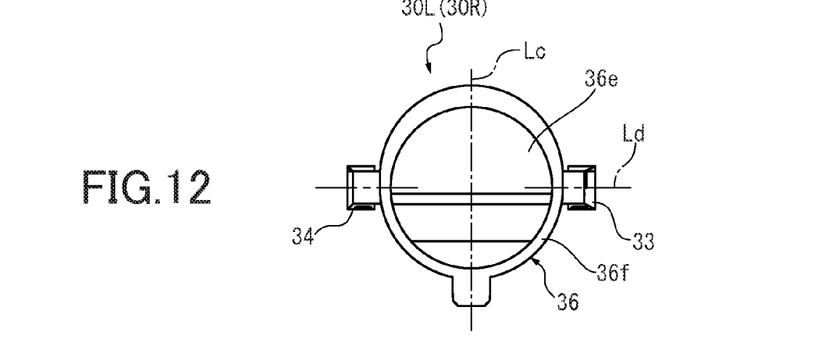
FIG. 12 is a plan view of the illuminations lens illustrated in FIG. 11.
Figure 15:
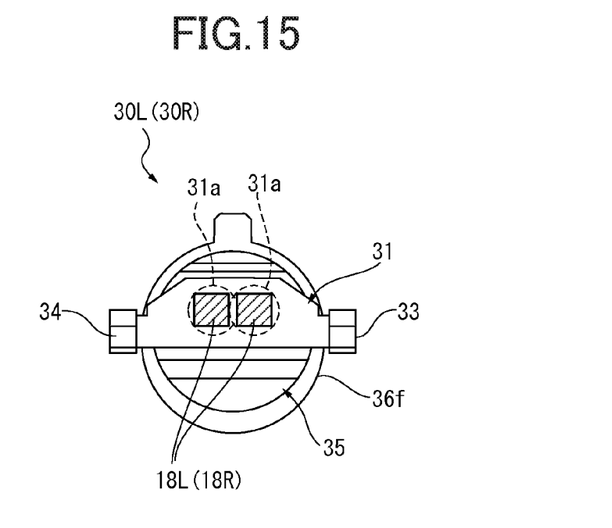
FIG. 15 is an explanatory view showing a positional relationship between a bottom surface of the illumination lens illustrated in FIG. 14 and light sources illustrated in FIG. 10.

Here, a line connecting circumferential centers of the thick portion 35a and the thin portion 35b of the refraction lens 35 is defined as a virtual line Lc, as illustrated in FIGS. 11, 12. Further, a line orthogonal to the virtual line Lc is defined as a virtual line Ld A light-emission surface 35e of the refraction lens 35 (i.e., a surface facing to the refraction lens 36) is a refraction surface having a cylindrical convex shape in which the cylindrical axis of the refraction lens 35 extends in the direction along the virtual line Ld. Note that a plan shape of the refraction lens 35 is formed in a circle, as illustrated in FIGS. 11, 12, and 15.

In the refraction lens 35 of the illumination lens 30L; the thick portion 35a is disposed on the outer side of the vehicle interior 2 in the width direction, while the thin portion 35b is disposed on the center side of the vehicle interior 2 in the width direction, as illustrated in FIG. 10. Besides, the virtual line Lc (illustrated in FIGS. 11 and 12) of refraction lens 35 of the illumination lens 30L is oriented to the width direction.

The refraction lens (second light-refraction part) 36 has a thick portion 36a at one end thereof and a thin portion 36b at the other end thereof, as illustrated in FIGS. 10, 16, and 17. Further, the refraction lens 36 has a thickness varying portion 36c connecting the thick portion 36a and the thin portion 36b. The thickness of the thickness varying portion 36c gradually decreases as going from the thick portion 36a to the thin portion 36b.

Here, a line connecting circumferential centers of the thick portion 36a and the thin portion 36b coincides with the virtual line Lc.

Further, the refraction lens 36 includes a light-incident surface (facing refraction surface) 36d facing to the light-emission surface 35e of the refraction lens 35. The light-incident surface 36d is a refraction surface having a cylindrical convex shape in which the cylindrical axis extends in the direction along the virtual line Ld. A plan shape of the refraction lens 36 is formed in a circle. Further, a light-emission surface 36e on the opposite side of the light-incident surface 36d is formed to be a refraction surface having a cylindrical convex shape. The cylindrical axis of the light-emission surface 36e extends in the direction along the virtual line Ld. Note that a flange 36f is formed around the refraction lens 36, as illustrated in FIGS. 11 to 17.

As illustrated in FIGS. 10, 16, and 17, the thick portions 35a, 36a of the refraction lenses 35, 36 are integrally formed with a connection portion 37. By having the abovementioned structure, the light-emission surface (facing refraction surface) 35e of the refraction lens 35 and the light-incident surface (facing refraction surface) 36d of the refraction lens 36 are gradually separated from each other as going from the thick portions 35a, 36a to the thin portions 35b, 36b.

In the refraction lens 36 of the illumination lens 30L; the thick portion 36a is disposed on the outer side of the vehicle interior 2 in the width direction, while the thin portion 36b is disposed on the center side of the vehicle interior 2 in the width direction, as illustrated in FIG. 10. Besides, the virtual line Lc (illustrated in FIGS. 11 and 12) of the refraction lens 36 of the illumination lens 30L is oriented toward the width direction.

In the refraction lenses 35, 36, the thick portions 35a, 36a and the thin portions 35b, 36b are integrally formed at the middle portions and the top portions of the first and second supporting poles 33, 34 by the injection molding. With this, the refraction lenses 35, 36 are supported by the first and second supporting poles 33, 34. In this embodiment, the thicknesses at connection points between the refraction lens 35 and the first and second supporting poles 33, 34 are formed to be the same. Further, the binding strengths of the refraction lens 35 with the first and second supporting poles 33, 34 are set to be the same. Accordingly, the thicknesses of the first and second supporting poles 33, 34 are set to be the same. Note that the first and second supporting poles 33, 34 extend toward a direction along the optical axis of the condenser lens 31a.

Additionally, the first and second supporting poles 33, 34 are projected from the lens forming plate 31 toward the light sources 18L. Also, a gap is defined between each printed substrate 17 and the corresponding lens forming plate 31 such that the light-emitting surface 18a of the light source 18L or 18L is positioned in the vicinity of the light-source-side surface 31c of the lens forming plate 31. Note that the light sources 18L, 18L are disposed at positions corresponding to the condenser lenses 31a, 31a of the lens forming plates 31. Further, the light emitting centers of the light-emitting surfaces 18a of the light sources 18L, 18L coincide with the optical axes of the condenser lenses 31a, 31a respectively.

Note that in this embodiment, the illumination lens 30L can be die-cut toward the direction in which the thickness of the refraction lenses 35, 36 varies when the illumination lens 30L is formed by the injection-molding. Accordingly, the refraction lenses 35, 36 do not need drafts in a direction vertical to the paper surface in FIG. 16 or 17 on the light-incident surface 35*d*, the light-emission surface 35*e*, and the light-incident surface 36*d*. As a result, when a single condenser lens 31*a* having a condensing action similar to that of the condenser lens 20*a* is used, the illumination area SL1 in the minor axis direction becomes less as illustrated by a two-dot chain line Sp1 in FIG. 9. On the other hand, in this embodiment, the illumination lens 30L can increase the illumination area SL1 in the minor axis direction as illustrated with a one-dot chain line Sp2 by spreading the divergent light emitted from the two adjacent light sources 18L, 18L with the two connected condenser lenses 31*a*, 31*a*. Note that although FIGS. 16 and 17 illustrate only one of the two condenser lenses 31*a*, 31*a*, the two condenser lenses 31*a*, 31*a* are aligned in the direction vertical to the paper surface in FIGS. 16 and 17.

Next, acts of the illumination device 11A having the above-explained structures will be described.

Upon lighting the light source 18L of the illumination lens 30L of the illumination device 11A illustrated in FIG. 10, divergent light emitted from the light source 18L enters the condenser lens 31*a*. The divergent light is condensed into an illumination light (illumination light flux) LEL, which is a substantially parallel light flux, by the condenser lens 31*a* and then advances from the condenser lens 31*a*. As explained, the illumination light advanced from the condenser lens 31*a* is not exactly a parallel light flux, i.e., the illumination light diverges with a slight angle.

The illumination light LEL advanced from the condenser lens 31*a* enters the light-incident surface 35*d* of the refraction lens 35 and is refracted toward the left side in the thickness varying portion 35*c* of the refraction lens 35. When the light is emitted from the light-emission surface 35*e* of the thickness varying portion 35*c*, the light is further refracted toward the left side.

The illumination light LEL emitted from the light-emission surface 35*e* enters the light-incident surface 36*d* of the refraction lens 36 and is refracted toward the left side in the thickness varying portion 36*c*. When the light is emitted from the light-emission surface 36*e* of the refraction lens 36, the light is further refracted toward the left side on the paper surface.

Figure 9:
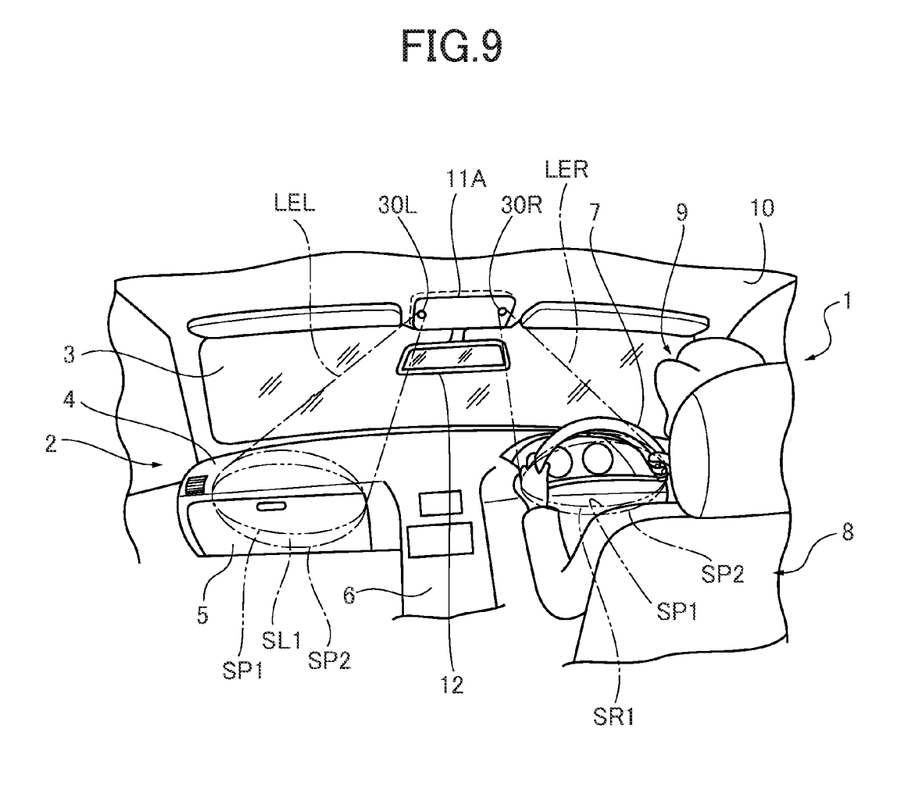
FIG. 9 is an explanatory view partially showing a vehicle having an illumination device equipped with another illumination lens according to a second embodiment of the present invention.

The illumination light LEL is then refracted by the refraction lenses 36, 36 and emitted from the illumination lens 30L to the vehicle interior 2. A light flux diameter of the illumination light LEL expands as the illumination light LEL advances away from the illumination lens 30L. Consequently, the illumination light LEL forms the illumination area SL1 with an elliptic shape on the instrument panel 4 on the left side (passenger's seat side), as illustrated in FIG. 9. Here, the illumination area having the elliptic shape has the major axis in the left-and-right direction on the paper surface and the minor axis in the longitudinal direction thereon.

Note that the illumination lens 30L has two (a plurality of) adjacent light sources 18L aligned in the longitudinal direction of the vehicle body 1 (vehicle), and the adjacent parts of the condenser lenses 31*a*, 31*a* are connected and partially overlapped. Therefore, the illumination area SL1 illuminated by the two light sources 18L, 18L and the illumination lens 30L are formed such that the minor axis in the longitudinal direction of the vehicle body 1 (vehicle) substantially has the same length as that of the illumination area SL with a greater illumination light quantity.

On the other hand, upon lighting the light source 18R of the illumination lens 30R of the illumination device 11A illustrated in FIG. 10, divergent light emitted from the light source 18R is condensed into an illumination light LER, which is a parallel light flux, by the condenser lens 31*a* of the illumination lens 19R and then emitted from the illumination lens 30R after being refracted toward the opposite side compared with the illumination light LEL. Consequently, the illumination light LER forms the illumination area SR1 with an elliptic shape around the steering wheel 7, as illustrated in FIG. 9. The illumination area SR1 having the elliptic shape has the major axis in the left-and-right direction and the minor axis in the longitudinal direction.

As described above, the illumination lens of the embodiments of this invention includes the condenser lens (20*a*, 31 *a*) to receive and condense the light emitted from the light source (18L, 18R) and a refraction optical member (light-deflection part 21 or light-deflection part 32) to receive and refract the light condensed by the condenser lens (20*a*, 31*a*). The illumination device is configured such that the illumination light (LEL, LER) emitted from the light source (18L, 18R) illuminates a predetermined area in a spot shape through the condenser lens (20*a*, 31*a*) and the refraction optical member (light-deflection part 21 or light-deflection part 32). Further, the light source (18L, 18R) includes the light-emitting surface 18*a* configured to emit the illumination light (LEL, LER) to only the condenser lens (20*a*, 31*a*). Besides, the condenser lens (20*a*, 31*a*) and the refraction optical member (light-deflection part 21 or light-deflection part 32) are integrally formed.

With this configuration, it is possible to provide an illumination lens that can suppress light diffusion to undesired directions with a small energy loss. That is, it is also possible to have a smaller illumination light quantity of the light source (18L, 18R) than that of the conventional device which generates an energy loss due to light diffusion of the illumination light. As a result, the illumination lens of the embodiments can reduce power consumption for the illumination light.

Further, in the illumination lens of the embodiments of this invention, the light-emitting surface 18*a* is positioned in the vicinity of the condenser lens (20*a*, 31 *a*), the light source (18L, 18R) is an LED or LD, and the condenser lens (20*a*, 31*a*) condenses the divergent light emitted from the light source (18L, 18R) into divergent light having a substantially parallel light flux and emits the condensed light to the refraction optical member (light-deflection part 21 or light-deflection part 32).

With this configuration, it is possible to reduce light diffusion of the illumination light emitted from the light source (18L, 18R) to undesired directions even when an LED or LD is used for the light source (18L, 18R), thereby reducing the energy loss. Consequently, it is possible to have a smaller light illumination quantity of the LED or LD (light source (18L, 18R)) than that of the conventional device. As a result, the illumination lens of the embodiments can reduce power consumption for the illumination light.

Further, in the illumination lens of the embodiments of this invention, the light-incident surface (light-source-side surface 20*c*, 31 *c*) of the condenser lens (20*a*, 31 *a*), which faces the light source (18L, 18R), is formed in a flat surface, and the light-emitting surface 18*a* of the light source (18L, 18R) and the light-incident surface (light-source-side surface 20*c*, 31*c*) of the condenser lens (20*a*, 31*a*) are positioned closely to each other with a small gap.

With this configuration, it is possible to effectively prevent the light diffusion of the illumination light emitted from the light source (18L, 18R) to undesired directions.

Further, in the illumination lens of the embodiments of this invention, the refraction optical member (light-deflection part 21 or light-deflection part 32) includes a plurality of light-refraction parts (refraction lenses 24, 25 or refraction lenses 35, 36).

Since the above configuration includes the plurality of light-refraction parts (refraction lenses 24, 25 or refraction lenses 35, 36), it is possible to easily orient the illumination light to the predetermined area with a small refraction quantity (refraction angle) of the light-refraction parts (refraction lenses 24, 25 or refraction lenses 35, 36).

If a single light-refraction part is formed through resin molding to achieve a desired refraction angle, it may cause a sink during the resin molding depending on the thickness of the light-refraction part. However, by having the plurality of light-refraction parts, it can suppress the occurrence of a sink in each light-refraction part while achieving the desired refraction angle.

Further, in the illumination lens of the embodiments of this invention, the light-refraction parts (refraction lenses 24, 25 or refraction lenses 35, 36) include thick portions (24a, 25a or 35a, 36a) at one end of the light-refraction parts, thin portions (24b, 25b or 35b, 36b) at the other end of the light-refraction parts, and thickness varying portions (24c, 25c or 35c, 36c). The thickness varying portions (24c, 25c or 35c, 36c) are formed such that each of the thicknesses between the thick portions (24a, 25a or 35a, 36a) and the thin portions (24b, 25b or 35b, 36b) gradually decreases as going from the corresponding thick portion (24a, 25a or 35a, 36a) to the corresponding thin portion (24b, 25b or 35b, 36b).

With this configuration, it is possible to easily orient the illumination light to the predetermined area with a small refraction quantity (refraction angle) of each light-refraction part (refraction lenses 24, 25 or refraction lenses 35, 36).

The illumination lens of the embodiments of this invention further includes supporting poles (first and second supporting poles 22, 23 or 33, 34) to support the condenser lens (20a, 31a) and the refraction optical member (refraction lenses 24, 25 or 35, 36) with gaps therebetween. The supporting pole member (first and second supporting poles 22, 23 or 33, 34) is integrally formed with the condenser lens (20a, 31a) and the refraction optical members (refraction lenses 24, 25 or refraction lenses 35, 36). Also, the light-incident surface (24d, 35d) of the light-refraction part (refraction lens 24, 35) disposed on the light source (18L, 18R) side faces the condenser lens (20a, 31a) and is inclined toward the opposite side of the condenser lens (20a, 31a) as going from the thick portion (24a, 35a) to the thin portion (24b, 35b).

With this configuration, it is possible to refract the illumination light advanced from the condenser lens (20a, 31a) toward the thick portions (24a, 35a) by the light-incident surface (24d, 35d) of the light-refraction part (refraction lens 24, 35) facing the condenser lens (20a, 31a), which is disposed on the light source (18L, 18R) side.

Further, in the illumination lens of the embodiments of this invention, the condenser lens (20a, 31a) is integrally formed with the lens forming plate (20, 31). Also, the condenser lens (20, 31) and the light-refraction parts (refraction lenses 24, 25 or 35, 36) are integrally formed through molding with the supporting pole member (first and second supporting poles 22, 23 or 33, 34), which supports the lens forming plate (20, 31) and the light-refraction parts (refraction lenses 24, 25 or 35, 36) with gaps therebetween. Furthermore, the condense lens (20a, 31a) is projected in the hemispherical shape toward the light-incident surface (24d, 35d) of the light-refraction part (refraction lens 24, 35) on the light source side.

As explained in Supplementary Explanation 6, the light-incident surface (24d, 35d) is provided on the light-refraction part (refraction lens 24, 35) that faces the condenser lens (20a, 31a) and is inclined so as to separate from the condenser lens (20a, 31a). As a result, an expanding space is formed between the light-incident surface (24d, 35d) of the light-refraction part (refraction lens 24, 35) and the lens forming plate (20, 31).

By projecting the condenser lens (20a, 31a) toward the light-incident surface (24d, 35d) of the light-refraction part (refraction lens 24, 35) to be the hemispherical shape, the condenser lens (20a, 31a) is disposed in the expanding space between the light-incident surface (24d, 35d) and the lens forming plate (20, 31). Therefore, it becomes possible to form a compact illumination lens (18L, 18R or 30L, 30R) although the condenser lens (20a, 31a) is projected in the hemispherical shape.

Further, in the illumination lens of the embodiments of this invention, facing refraction surfaces (the light-emission surface 24e and the light-incident surface 25d, or the light-emission surface 35e and the light-incident surface 36d) of the plurality of the light-refraction parts (refraction lens 24, 25 or 35, 36) are formed so as to separate from each other as going from the thick portions (24a, 25a or 35a, 36a) to the thin portions (24b, 25b or 35b, 36b).

With this configuration, it is possible to effectively refract the illumination light advanced from the condenser lens (20a, 31a) toward the same side.

Further, in the illumination lens of the embodiments of this invention, the light-refraction part (refraction lens 25) on the light-emission side among the plurality of the light-refraction parts (refraction lens 24, 25) includes a refraction lens (refraction lens 25), and the facing refraction surfaces (light-incident surface 25d) of the refraction lens (refraction lens 25) is curved to have a convex-and-concave shape.

With this configuration, it is possible to refract the illumination light advanced from the condenser lens (20a, 31a) even more.

Further, in the illumination lens of the embodiments of this invention, the supporting pole member (first and second supporting poles 22, 23) includes a first supporting pole 22 that supports the thick portions (24a, 25a) of the light-refraction parts (refraction lens 24, 25), and a second supporting pole 23 that supports the thin portions (24b, 25b) of the light-refraction parts (refraction lens 24, 25).

With this configuration, it is possible to suppress variations in positions of the refractive parts and the condenser lens.

Further, in the illumination lens of the embodiments of this invention, the plurality of the light-refraction parts (refraction lenses 24, 25 or 35, 36) include refraction lenses (refraction lenses 24, 25 or 35, 36), and the facing refraction surfaces (the light-emission surface 24e and the light-incident surface 25d, or the light-emission surface 35e and the light-incident surface 36d) of the refraction lenses (refraction lenses 24, 25 or 35, 36) are projected in cylindrical shapes.

With this configuration, it is possible to refract the illumination light advanced from the condenser lens (20a, 31 a) sufficiently.

Further, in the illumination lens of the embodiments of this invention, the light-emission surface 36e of the refraction lens (refraction lens 36) on the light-emission side among the plurality of the refraction lenses (refraction lenses 35, 36) is formed in a cylindrical convex shape.

With this configuration, it is possible to refract the illumination light advanced from the condenser lens (20a, 31a) more sufficiently.

Further, in the illumination lens of the embodiments of this invention, the supporting pole member (first and second supporting poles 33, 34) includes the first supporting pole 33 and the second supporting pole 34. The first and second supporting poles 33, 34 support the end portions of the condenser lens (31a) and the end portions of the plurality of light-refraction parts (refraction lenses 35, 36) in the direction orthogonal to the virtual line Lc that connects one end of the light-refraction parts (refraction lenses 35, 36) and the other end of the light-refraction parts.

With this configuration, it can simplify the structure of the molding die, thereby facilitating the manufacture of the die. Note that this effect should be achieved even if the positions of the supporting pole member (first and second supporting poles 33, 34) shifts from the virtual line Lc in the circumferential direction.

Further, in the illumination lens of the embodiments of this invention, the thick portions (35a, 36a) of the plurality of the light-refraction parts (refraction lenses 35, 36) are integrally formed with the connection portion 37 at a position between the first and second supporting poles 33, 34.

With this configuration, it is possible to suppress variations in positions of the refractive parts and the condenser lens. Further, it facilitates to assemble the illumination lens with an illumination device since the plurality of the lenses are formed integrally.

Further, the illumination lens of the embodiments of this invention includes the plurality of the condenser lenses (31a) aligned in the direction orthogonal to the virtual line LC.

With this configuration, even when a single light source cannot achieve a desired light intensity, it becomes possible to achieve the desired high light intensity and can increase the illumination area in the minor axis direction by aligning the plurality of light sources close to each other.

Note that in this embodiment, the number of the light sources (LED) is two. However, it is only an example. The light source may have three or more light sources.

Further, in the illumination lens of the embodiments of this invention, the plurality of the condenser lenses (31a, 31a) are partially overlapped with each other at adjacent parts of the condenser lenses (31a, 31a).

With this configuration, it is possible to prevent the illumination light from being divided into plural areas and to enlarge the illumination area while having the plurality of light sources (18L, 18L or 18R, 18R).

The invention claimed is:

1. An illumination lens, comprising:
    a condenser lens configured to receive illumination light emitted from a light-emitting surface of a light source at a light-incident surface and to condense the illumination light, the light-incident surface being disposed in a vicinity of the light-emitting surface of the light source; and
    a refraction optical member configured to receive and refract the light condensed by the condenser lens the refraction optical member being integrally formed with the condenser lens, wherein
    the illumination lens is configured such that the illumination light emitted from the light source illuminates a predetermined area in a spot shape through the condenser lens and the refraction optical member,
    the condenser lens is configured to condense divergent light emitted from the light source into divergent light having a substantially parallel light flux and to emit the condensed light flux to the refraction optical member,
    the refraction optical member includes a plurality of light-refraction parts,
    the plurality of the light-refraction parts each includes a thick portion at one end of the light-refraction part, a thin portion at the other end of the light-refraction part, and a thickness varying portion connecting the thick part and the thin part, and
    the thickness varying portion is formed such that the thickness between the thick portion and the thin portion gradually decreases as going from the thick portion to the thin portion.

2. The illumination lens as claimed in claim 1, a light-incident surface of the light-refraction part facing the condenser lens is inclined toward an opposite side of the condenser lens side as going from the thick portion to the thin portion.

3. The illumination lens as claimed in claim 2, wherein
    the condenser lens is integrally formed with a lens forming plate,
    the condenser lens and the light-refraction parts are integrally formed thorough molding with a supporting pole member that supports the lens forming plate and the light-refraction parts with a gap between the lens forming plate and the light-refraction parts, and
    the condenser lens is projected in a hemispherical shape toward the light-incident surface of the light-refraction part on the light source side.

4. The illumination lens as claimed in claim 3, wherein
    the plurality of the light-refraction parts include facing refraction surfaces that are facing each other, and
    the facing refraction surfaces are separated from each other as going from the corresponding thick portions to the corresponding thin portions.

5. The illumination lens as claimed in claim 4, wherein
    the light-refraction part on a light-emission side among the plurality of the light-refraction parts includes a refraction lens, and
    the facing refraction surface of the refraction light is curved to have a convex-and-concave shape.

6. The illumination lens as claimed in claim 4, wherein the supporting pole member includes a first supporting pole that supports the thick portions of the light-refraction parts and a second supporting pole that supports the thin portions of the light-refraction parts.

7. The illumination lens as claimed in claim 4, wherein
    the plurality of the light-refraction parts include a plurality of refraction lenses, and
    the facing refraction surfaces of the plurality of the light-refraction parts are projected in cylindrical shapes.

8. The illumination lens as claimed in claim 7, wherein a light-emission surface of the refraction lens on a light-emission side among the plurality of the refraction lenses is formed in a cylindrical convex shape.

9. The illumination lens as claimed in claim 4, wherein
    the supporting pole member includes a first supporting pole and a second supporting pole, and
    the first and second supporting poles support end portions of the condenser lens and end portions of the plurality of the light-refraction parts in a direction orthogonal to a virtual line connecting one end of the light-refraction parts and the other end of the light-refraction parts.

10. The illumination lens as claimed in claim 9, wherein the thick portions of the plurality of the light-refraction parts are integrally formed with a connection portion at a position between the first and second supporting poles.

11. The illumination lens as claimed in claim 9, further including the plurality of the condenser lenses aligned in the direction orthogonal to the virtual line.

12. The illumination lens as claimed in claim 11, wherein the plurality of the condenser lenses are partially overlapped with each other at adjacent parts of the condenser lenses.

* * * * *